(12) United States Patent
Guo et al.

(10) Patent No.: US 8,909,790 B2
(45) Date of Patent: Dec. 9, 2014

(54) METHOD, SERVER AND SYSTEM FOR CONTROLLING A VIRTUAL ROLE

(75) Inventors: Bijian Guo, Shenzhen (CN); Wu Hu, Shenzhen (CN); Lei Xia, Shenzhen (CN); Qiuping Wei, Shenzhen (CN); Haibing Wang, Shenzhen (CN); Song Du, Shenzhen (CN); Baoyuan Ou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 786 days.

(21) Appl. No.: 12/474,792

(22) Filed: May 29, 2009

(65) Prior Publication Data

US 2009/0248881 A1     Oct. 1, 2009

Related U.S. Application Data

(63) Continuation of application No. PCT/CN2007/071022, filed on Nov. 6, 2007.

(30) Foreign Application Priority Data

Nov. 30, 2006 (CN) .......................... 2006 1 0145984

(51) Int. Cl.
*G06F 15/16* (2006.01)
*G06Q 30/00* (2012.01)
*H04L 12/18* (2006.01)

(52) U.S. Cl.
CPC ............ *G06Q 30/00* (2013.01); *H04L 12/1818* (2013.01)
USPC ............................................ 709/227; 463/42

(58) Field of Classification Search
USPC ............................................ 709/227; 463/42
See application file for complete search history.

(56) References Cited

U.S. PATENT DOCUMENTS 6,522,333 B1 *   2/2003   Hatlelid et al. ............... 345/474
2003/0186208 A1   10/2003   Wen et al.
(Continued)

FOREIGN PATENT DOCUMENTS

| CN | 1516401 A | 7/2004 |
|---|---|---|
| CN | 1532782 A | 9/2004 |

(Continued)

OTHER PUBLICATIONS

Chinese Office Action for Chinese Patent Application No. 2006101459848, dated Jan. 14, 2009, and English translation thereof.

(Continued)

*Primary Examiner* — Tonia L Dollinger
*Assistant Examiner* — Steven Nguyen
(74) *Attorney, Agent, or Firm* — Harness, Dickey & Pierce, P.L.C.

(57) ABSTRACT

A method for controlling a virtual role includes: initiating, by a source virtual role client, a virtual role trip request carrying an identification of a destination virtual role client to a control server on the network side; establishing, by the control server, a session between the source virtual role client and the destination virtual role client, and sending attribute information of the virtual role to the destination virtual role client through the network; displaying, by the destination virtual role client, the virtual role in a local user interface. Structures of the control server and systems for controlling virtual role are also provided. According to the present invention, a virtual role of a source virtual role client can make a trip to a destination virtual role client through the network without relying on a user client.

18 Claims, 8 Drawing Sheets

(56) References Cited

U.S. PATENT DOCUMENTS

| | | | |
|---|---|---|---|
| 2005/0223328 A1* | 10/2005 | Ashtekar et al. | 715/706 |
| 2006/0190524 A1* | 8/2006 | Bethke et al. | 709/202 |
| 2006/0247051 A1 | 11/2006 | Liu et al. | |
| 2007/0002057 A1* | 1/2007 | Danzig et al. | 345/473 |
| 2007/0155453 A1 | 7/2007 | Fujioka et al. | |

FOREIGN PATENT DOCUMENTS

| | | |
|---|---|---|
| CN | 1801085 A | 7/2006 |
| JP | 2003131997 A | 5/2003 |
| WO | 03010986 A1 | 2/2003 |
| WO | 2006/033249 A1 | 3/2006 |

OTHER PUBLICATIONS

International Search Report for International Application No. PCT/CN2007/071022, dated Feb. 21, 2008, and English translation thereof.

Japanese Office Action for Application No. 2009-538577 dated Apr. 5, 2012, and its English translation thereof.

Japanese Office Action for Application No. 2009-538577 dated Jun. 9, 2011, and its English translation thereof.

* cited by examiner

METHOD, SERVER AND SYSTEM FOR CONTROLLING A VIRTUAL ROLE

CROSS-REFERENCE TO RELATED APPLICATIONS

This application is a continuation of International Patent Application No. PCT/CN2007/071022 filed on Nov. 6, 2007. This application claims the benefit and priority of Chinese Patent Application No. 200610145984.8, filed Nov. 30, 2006. The entire disclosures of each of the above applications are incorporated herein by reference.

FIELD

The present disclosure relates to network communication fields, and more particularly, to method, server and system for controlling a virtual role.

BACKGROUND

This section provides background information related to the present disclosure which is not necessarily prior art.

An earliest virtual role in the prior art, such as an electronic virtual role, etc., can only be shown on a display of an electronic terminal operated by a user, and the user can only interact with his/her own virtual role.

With the development of network services, web chat has become a popular online service for network users. When chatting with a friend, the users may start their virtual role clients to realize communication of their virtual roles, e.g. chatting partners, via a PET-TO-PET communication channel, e.g. display the virtual role of a user in a user interface of a chatting partner synchronously.

FIG. 1 is a flowchart for synchronously displaying a virtual role in accordance with the prior art. As shown in FIG. 1:

In step S101, a client of User A initiates a request to a chatting partner server requesting to chat with a virtual role of User B;

In step S102, the chatting partner server stores user information of two users performing virtual role chatting and generates an MD5 authenticating character string for authentication;

In step S103, the client of User A acquires the MD5 authenticating character string.

In step S104, the client of User A informs the client of User B of the MD5 authenticating character string through a system message.

In step S105, User A and User B start their respective virtual role clients. The virtual role clients respectively display a shape of the virtual role of the other party on their electronic terminals based on shape data of the virtual roles stored in the chatting partner server.

In step S106, the two virtual role clients display the shapes of the virtual roles of the two users on desktops of the two users synchronously via a system message communication channel.

In the prior art, a user can only display his/her virtual role on the user interface of his/her friend while chatting with the friend. The user, however, can not implement a trip of the virtual role, i.e. making his/her virtual role disappear from his/her virtual role client and appear on the user interface of a destination virtual role client of the trip. Thus the user of the virtual role can not experience the fun of his/her virtual role leaving and returning to the user interface of the local virtual role client.

There are two types of clients in the prior art, i.e. user clients for processing user-related actions and procedures, such as chatting between users; and virtual role clients for processing virtual role-related actions and procedures, such as actions performed by virtual roles to imitate actions in real-life, e.g. laboring, playing, etc.

Firstly, from the above prior art process, the users do not start the virtual role clients from step S101 to step S104, that is, the interactions between the virtual roles are performed by user clients instead of virtual role clients. And the interactions between the virtual roles can only take place after the two users start the chatting procedure, i.e. after the two user clients begin communicating with each other, which is inconvenient for the users.

Secondly, there is no connection maintained between the chatting partner server and the virtual role clients after the virtual role chatting is started, and the chatting partner server only functions as a temporary storage of virtual role data (e.g. shape data and so on). There is no actual interaction between the virtual roles but synchronous display of actions triggered by system messages without an interaction function.

SUMMARY

This section provides a general summary of the disclosure, and is not a comprehensive disclosure of its full scope or all of its features.

The present invention provides method, server and system for controlling a virtual role, so as to solve a problem in the prior art that a virtual role client can only perform a virtual role trip via a user client. The technical schemes are as follows.

A method for controlling a virtual role includes:

initiating, by a source virtual role client, a virtual role trip request to a control server requesting a trip for a virtual role of the source virtual role client, wherein the virtual role trip request carries an identification of a destination virtual role client;

establishing, by the control server, a session between the source virtual role client and the destination virtual role client;

sending, by the control server, attribute information of the virtual role obtained from the source virtual role client to the destination virtual role client;

displaying, by the destination virtual role client, the virtual role in a local user interface based on the attribute information of the virtual role.

A method for controlling a virtual role includes:

initiating, by a source virtual role client, a virtual role trip request to a control server requesting a trip for a virtual role of the source virtual role client;

storing, by the control server, an identification of the source virtual role client of the virtual role;

finding, by the control server, a matching trip friend for the virtual role according to a pre-set matching policy when determining there are identifications of at least two virtual role clients stored in the control server;

establishing, by the control server, a session between the source virtual role client of the virtual role and a virtual role client of the trip friend, obtaining attribute information of the trip friend and sending the attribute information to the source virtual role client;

displaying, by the source virtual role client in a local user interface, shapes of the virtual role and the trip friend.

A control server includes: an input/output interface module, a trip request receiving module, a session processing module and an information delivering module, wherein the input/output interface module is adapted to receive a virtual role trip request initiated by a source virtual role client of a virtual role, and forward attribute information of the virtual role obtained from the source virtual role client to a destination virtual role client;

the trip request receiving module is adapted to receive the virtual role trip request, send an instruction for establishing a session to the session processing module, wherein the virtual role trip request carries an identification of the destination virtual role client;

the session processing module is adapted to establish a session between the source virtual role client and the destination virtual role client based on the identification of the destination virtual role client, and inform the information delivering module that the session is established;

the information delivering module is adapted to forward the attribute information of the virtual role via the input/output interface module after being informed.

A control server includes an input/output interface module, a trip request receiving module, a session processing module, an information delivering module, and a public place trip implementing module, wherein the input/output interface module is adapted to receive a virtual role trip request from a source virtual role client of a virtual role, forward the virtual role trip request to the trip request receiving module, and send attribute information of a trip friend obtained from a virtual role client of the trip friend to the source virtual role client;

the trip request receiving module is adapted to receive the virtual role trip request, send an identification of the source virtual role client to the public place trip implementing module;

the public place trip implementing module is adapted to store the identification of the source virtual role client of the virtual role, match the trip friend for the virtual role, and send an instruction message for establishing a session to the session processing module;

the session processing module is adapted to establish a session between the source virtual role client and the virtual role client of the trip friend, and inform the information delivering module that the session is established;

the information delivering module is adapted to forward the attribute information of the trip friend via the input/output interface module after being informed.

A system for controlling a virtual role includes a source virtual role client, a control server and a destination virtual role client, wherein the source virtual role client is adapted to send a virtual role trip request carrying an identification of the destination virtual role client;

the control server is adapted to establish a session between the source virtual role client and the destination virtual role client based on the identification of the destination virtual role client carried in the virtual role trip request, send attribute information of the virtual role obtained from the source virtual role client to the destination virtual role client;

the destination virtual role client is adapted to display the virtual role according to the attribute information of the virtual role.

A system for controlling a virtual role includes a source virtual role client and a control server, wherein the source virtual role client is adapted to initiate a virtual role trip request to the control server;

the control server is adapted to store an identification of the source virtual role client carried in the virtual role trip request, match a trip friend for the virtual role based on a pre-set matching policy when determining there are identifications of at least two virtual role clients stored in the control server, establish a session between the source virtual role client and a virtual role client of the trip friend, and forward attribute information of the trip friend obtained from the virtual role client of the trip friend to the source virtual role client;

the source virtual role client is further adapted to display shapes of the virtual role and the trip friend after receiving the attribute information of the trip friend.

In view of the foregoing, according to the method of the present invention, the source virtual role client of the virtual role initiates a virtual role trip request carrying identification information of a destination virtual role client to a control server on the network side; the control server establishes a session between the source virtual role client and the destination virtual role client, and sends attribute information of the virtual role or together with instruction information for controlling the virtual role to the destination virtual role client through the network; the destination virtual role client displays the virtual role in a local user interface. Thus, the trip of the virtual role can be implemented by setting a control server on the network side for connecting the source virtual role client where the virtual role resides before the trip and the destination virtual role client. The implementation is simple, convenient and has a low cost. And there is no need to establish chatting between the source virtual role client and the destination virtual role client in advance.

In addition, compared with the prior art where a chatting server can only generate and transmit MD5 authenticating character string, the method of the present invention adopts a control server to process signaling interacted between virtual roles, which makes communications between virtual role clients more safe and convenient and provides much more flexible trip modes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In the present invention, a source virtual role client firstly initiates a virtual role trip request to a control server to request a trip for a virtual role of the source virtual role client, wherein the virtual role trip request contains an identification of a destination virtual role client.

Then the control server establishes a session between the source virtual role client and the destination virtual role client and sends attribute information of the virtual role to the destination virtual role client.

Finally, the destination virtual role client displays the virtual role on a local interface according to the attribute information of the virtual role.

The present invention will be explained in detail hereinafter with reference to the accompanying drawings and embodiments.

The First Embodiment

Figure 1:
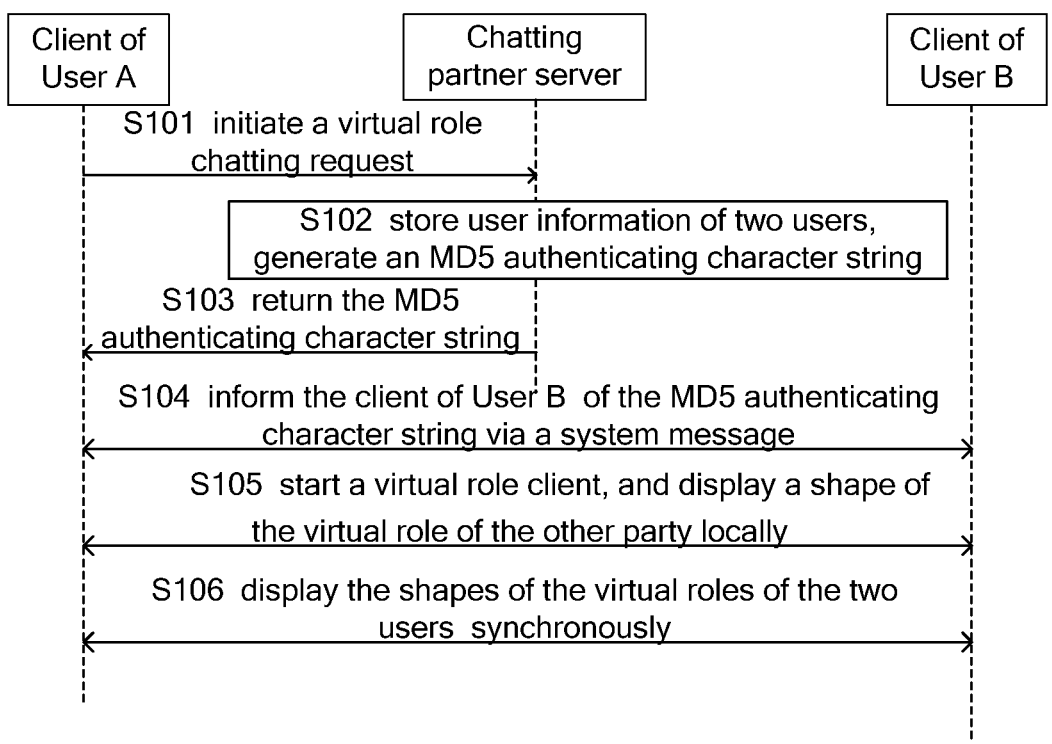
FIG. 1 is a flowchart for synchronously displaying a virtual role in accordance with the prior art.
Figure 2:
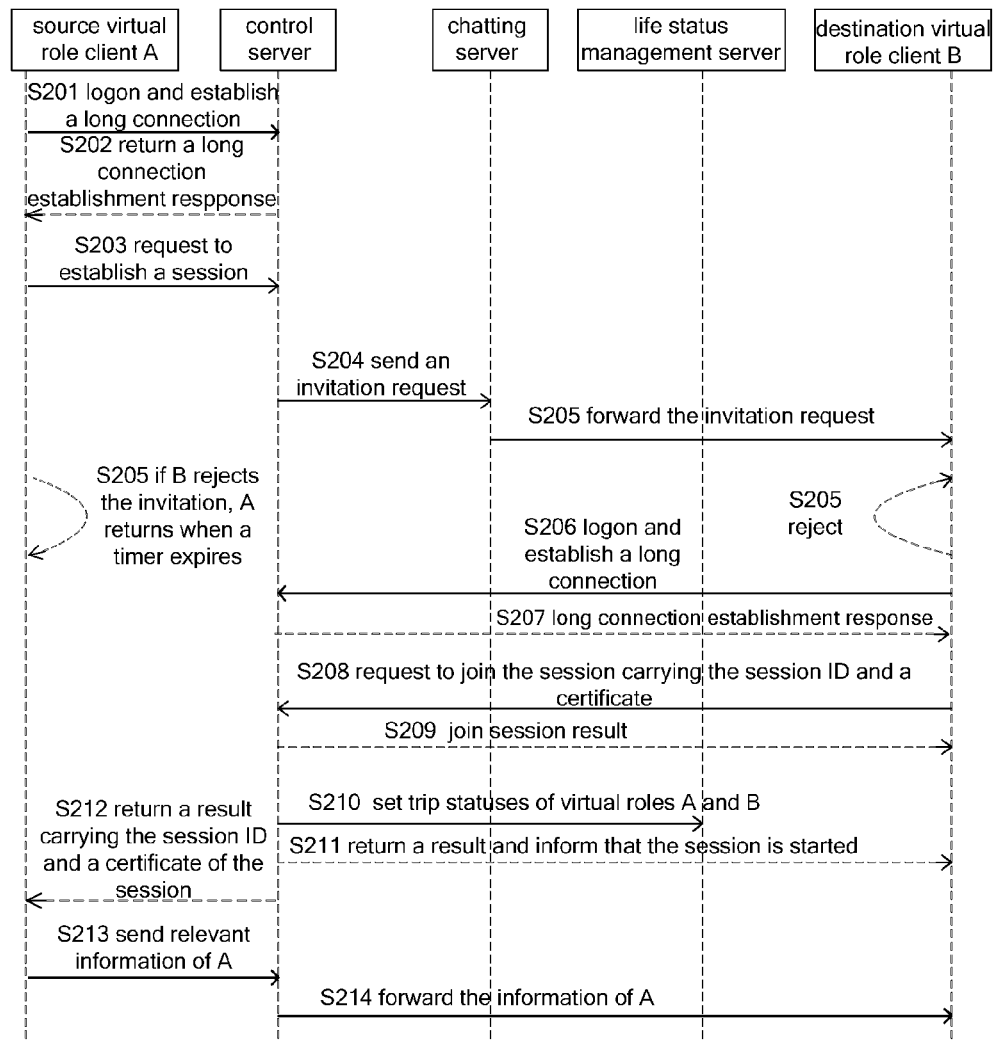
FIG. 2 is a flowchart illustrating a signaling procedure of a virtual role making a trip when a source virtual role client initiates a trip request in accordance with an embodiment of the present invention.

FIG. 2 is a flowchart illustrating a signaling procedure of virtual role A requesting to make a trip to virtual role client B of virtual role B (i.e. virtual role client B is a destination virtual role client of virtual role A) in accordance with an embodiment of the present invention. FIG. 2 shows source virtual role client A to which virtual role A belongs; destination virtual role client B to which virtual role B belongs; a control server for enabling a virtual role trip, being a logical entity or a physical entity provided by the present invention for managing trips of multiple virtual roles in the network; and a service server which virtual role client B logs on, e.g. a chatting server. The control server has connections established in advance with at least one service server on the network side. After receiving a virtual role trip request, the control server may obtain knowledge of the service server which the destination virtual role client logs on from the service servers connected, and sends a message to the destination virtual role client via the service server which the destination virtual role client logs on. If the destination virtual role client has logged on the control server of the present invention, the control server may send messages to the destination virtual role client directly.

A life status management server at the network side is a server provided by the network side in the prior art for specifically managing life status data of each virtual role in the network. The life status management server and virtual role clients of the virtual roles update attribute information of the virtual roles, i.e. various life status data of the virtual roles, periodically and synchronously. The life status of a virtual role may be represented by status data of the virtual role which has a value indicating working, studying, playing in a community, hungry, ill, dirty or dead.

Refer to FIG. 2, suppose that virtual role client A logs on the control server and initiates a virtual role trip request, and destination virtual role client B has logged on a chatting server.

The signaling procedure is described in detail as follows.

In step S201, source virtual role client A of virtual role A logs on the control server and requests to establish a long connection.

In step S202, the control server establishes the long connection with source virtual role client A and returns a long connection establishment response message.

In step S203, source virtual role client A initiates a session establishment request carrying identification information of destination virtual role client B to indicate that virtual role A wishes a trip to virtual role client B of virtual role B.

In step S204, the control server allocates a session identity (session ID) for this session and sends a session request message carrying the session ID to the chatting server which destination virtual role client B logs on.

In step S205, the chatting server forwards the session request message to destination virtual role client B. If the user of destination virtual role client B refuses the visit of other virtual roles, destination virtual role client B may not perform any action in response. If source virtual role client A does not receive any response until a pre-defined timer expires, it will end the current trip. If the user of destination virtual role client B decides to accept the visit of other virtual roles, following steps are performed.

In step S206, destination virtual role client B sends a logon request to the control server requesting to establish a long connection.

In step S207, the control server establishes the long connection with destination virtual role client B, and sends a long connection establishment response message to destination virtual role client B.

In step S208, destination virtual role client B sends a join session request to the control server carrying the session ID and a certificate for agreeing to join the session.

In step S209, the control server establishes the session between source virtual role client A and destination virtual role client B, and returns a join session result message to destination virtual role client B.

In step S210, the control server sets the life status of virtual role A and the life status of virtual role B as "on trip", and informs the life statuses to the life status management server. The life status management server updates corresponding life status data in local storage.

In step S211, the control server informs destination virtual role client B that the session starts.

In step S212, the control server informs source virtual role client A that the session has been established carrying the session ID, the certificate of destination virtual role client B for agreeing to join the session.

In step S213, source virtual role client A sends attribute information of virtual role A (including various life status data and identification information of virtual role A, etc.) to the control server. Meanwhile, virtual role A disappears from a local user interface, which represents that virtual role A has left the local client. Besides, source virtual role client A may control actions of virtual role A by sending instruction information to the control server together with the attribute information for controlling the actions of virtual role A.

In step S214, the control server forwards the attribute information of virtual role A or forwards the attribute information together with the instruction information to destination virtual role client B. After obtaining the attribute information of virtual role A, destination virtual role client B displays the shape of virtual role A, which represents virtual role A has come for a visit. If source virtual role client A also sends the instruction information, virtual role A may perform various actions in the user interface of destination virtual role client B according to the instruction information. At this time, the user interface of destination virtual role client B presents shapes of virtual role A and virtual role B simultaneously.

The above process takes the trip of one virtual role to the virtual role client of another virtual role as an example. In practice, multiple virtual roles may trip to a same virtual role client at the same time.

In addition, in the above step S203, the trip request may be sent initiatively by the virtual role of the source virtual role client according to pre-set conditions or be sent initiatively by the user of the source virtual role client.

When initiating a trip request, the source virtual role client may select a destination virtual role client from a online friend list of the virtual role in local storage (the source virtual role client may interact with the life status management server to obtain online friend information of the virtual role and stores the friend information in local storage), and initiates the trip request carrying identification information of the destination virtual role client.

In the detailed process of the first embodiment, before step S204, the control server may interact with the life status management server to obtain current life status data of the virtual role requesting the trip and determine whether the virtual role of the destination virtual role client is in the destination virtual role client. The control server may also determine whether the life status of the virtual role requesting the trip meets a pre-set trip condition. If the pre-set trip condition is met and the virtual role of the destination virtual role client is in the destination virtual role client, proceed to step S204; otherwise, the control server directly returns a request rejected message to the source virtual role client and ends the procedure. Through pre-setting the trip condition, a virtual role is allowed to make a trip only when the trip condition is met, which enriches the service content.

In the process shown in FIG. 2, the trip request is initiated by source virtual role client A. In practice, destination virtual role client B may initiates an invitation request first. After receiving the invitation request, source virtual role client A may initiate the trip request. The process will be described in detail with reference to FIG. 3.

In step S301, destination virtual role client B logs on a control server to establish a long connection.

In step S302, destination virtual role client B initiates an invitation request to the control server carrying identification information of source virtual role client A being invited, i.e. invites virtual role A of source virtual role client A to destination virtual role client B.

In step S303, the control server forwards the invitation request to source virtual role client A.

In step S304, after accepting the invitation, source virtual role client A of virtual role A logs on the control server to establish a long connection.

In step S305, the control server establishes the long connection with source virtual role client A, and returns a long connection establishment response message.

In step S306, source virtual role client A initiates a session establishment request to the control server carrying identification information of destination virtual role client B indicating that source virtual role client A has accepted the invitation.

In step S307, the control server allocates a session identity (session ID) for the session and sends an invitation message carrying the session ID to destination virtual role client B for inviting destination virtual role client B to join the session.

In step S308, destination virtual role client B sends a join session request to the control server carrying the session ID and a certificate for agreeing to join the session.

In step S309, the control server establishes a session between source virtual role client A and destination virtual role client B, and returns a join session result message to destination virtual role client B.

In step S310, the control server sets the life status of virtual role A and the life status of virtual role B as "on trip", and informs the life statuses to the life status management server. The life status management server updates the corresponding life status data in local storage.

In step S311, the control server informs destination virtual role client B that the session starts.

In step S312, the control server informs source virtual role client A that the session has been established carrying the session ID, the certificate of destination virtual role client B.

In step S313, source virtual role client A sends attribute information of virtual role A (including various life status data and identification information of virtual role A, etc.). Meanwhile, virtual role A disappears from a local user interface, which represents that virtual role A has left. Besides, source virtual role client A may control actions of virtual role A by sending instruction information together with the attribute information to the control server to control the actions of virtual role A.

In step S314, the control server forwards the attribute information of virtual role A or forwards the attribute information together with the instruction information to destination virtual role client B. After obtaining the attribute information of virtual role A, destination virtual role client B displays the shape of virtual role A, which represents virtual role A has come for a visit. If source virtual role client A also sends the instruction information, virtual role A may perform various actions in the user interface of destination virtual role client B according to the instruction information. At this time, the user interface of destination virtual role client B simultaneously presents shapes of virtual role A and virtual role B.

Figure 4:
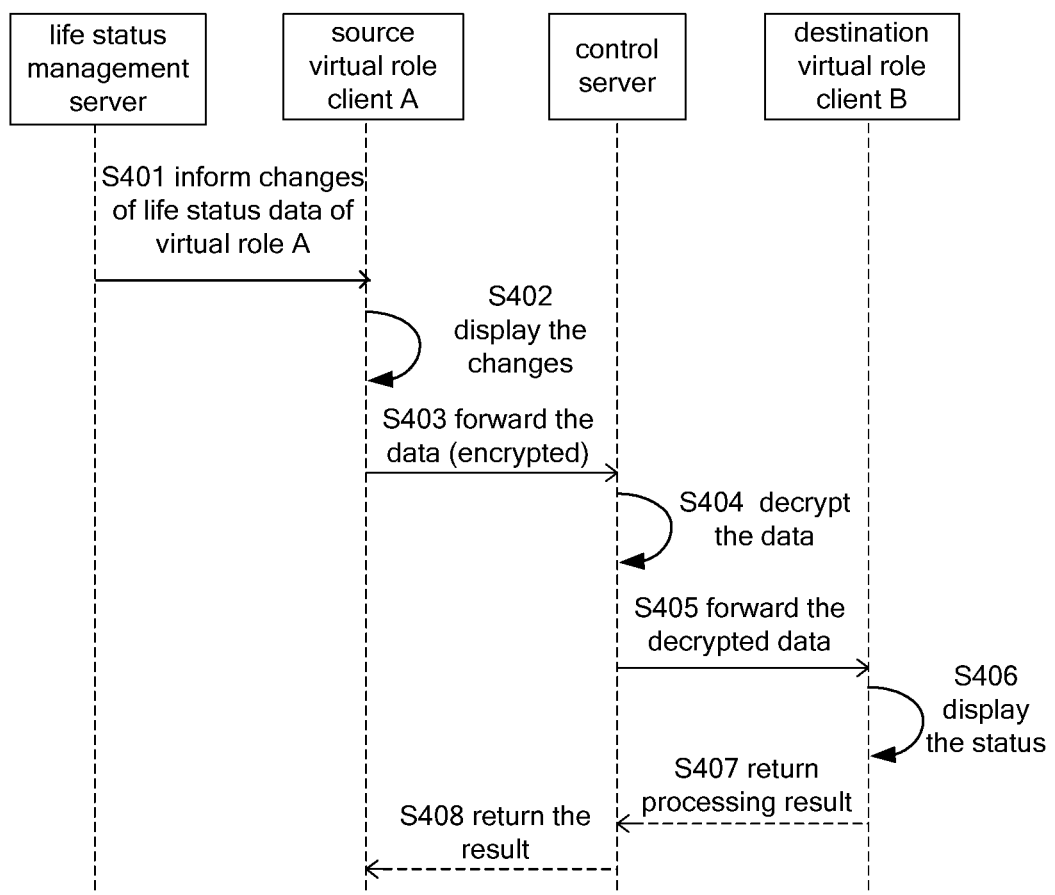
FIG. 4 is a flowchart illustrating a signaling procedure of forwarding life status data of a virtual role to a destination virtual role client via a control server in accordance with an embodiment of the present invention.

In addition, since the life status data of a virtual role varies with factors such as time, the life status data of the virtual role needs to be updated after the virtual role goes on a trip. Taking the trip of virtual role A shown in FIG. 2 as an example, the signaling procedure for synchronously updating the life status data is as shown in FIG. 4.

In step S401, the life status management server sends change value information of the life status data of virtual role A to source virtual role client A of virtual role A periodically.

The change value information may include two copies of data, i.e. an un-encrypted copy and an encrypted copy.

In step S402, source virtual role client A displays in a local user interface the current life status of virtual role A, e.g. hungry, ill, etc., according to the un-encrypted copy.

In step S403, source virtual role client A forwards the encrypted copy to the control server.

In step S404, the control server decrypts the encrypted copy.

In step S405, the control server sends the decrypted data to destination virtual role client B of virtual role A.

In step S406, destination virtual role client B displays in a local user interface the current life status of virtual role A according to the life status data of virtual role A, e.g. hungry, ill, etc.

In step S407, destination virtual role client B returns a data processing result to the control server.

In step S408, the control server forwards the data processing result to source virtual role client A.

After establishing a session and implementing the trip of the virtual role, the control server may determine periodically whether the trip of the virtual role meets a pre-set trip ending condition. If the trip ending condition is met, the control server informs the destination virtual role client to hide the virtual role and delete local data of the visiting virtual role, and informs the source virtual role client to display the virtual role, and deletes the established session.

The determining of whether the trip of the virtual role meets the pre-set trip ending condition may be as follows:
1) determining to end the trip when a duration of the session reaches a pre-set maximum session duration;
2) determining to end the trip when receiving an ending session request from the destination virtual role client;
3) determining to end the trip when receiving an ending session request from the source virtual role client;
4) determining to end the trip when the life status of the virtual role meets a pre-set session ending condition.

The above trip ending conditions may be pre-stored in the control server.

Figure 5:
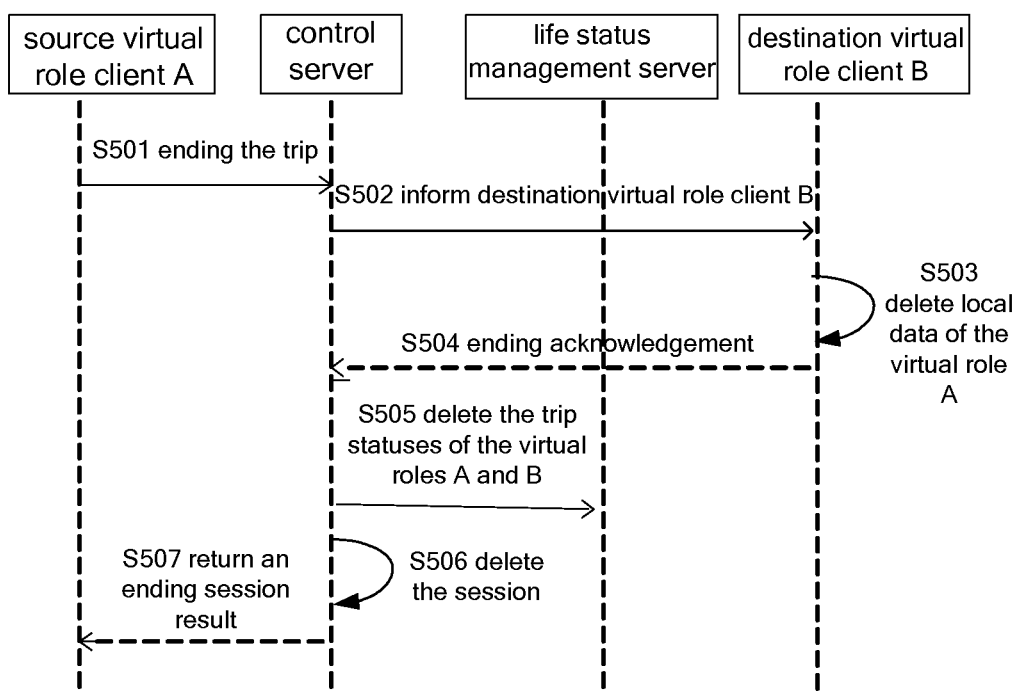
FIG. 5 is a flowchart illustrating a signaling procedure of a virtual role ending a trip in accordance with an embodiment of the present invention.

FIG. 5 is a flowchart illustrating a signaling procedure when source virtual role client A requests to end the trip.

In step S501, source virtual role client A sends an ending session request to the control server.

In step S502, the control server informs destination virtual role client B to end the session.

In step S503, destination virtual role client B deletes local data of virtual role A, and hides the shape of virtual role A from the local user interface.

In step S504, destination virtual role client B returns an ending session acknowledgement to the control server.

In step S505, the control server informs the life status management server to delete the trip status of virtual roles A and B, and to restore the normal status of virtual roles A and B.

In step S506, the control server deletes the locally established session.

In step S507, the control server returns an ending session success response to source virtual role client A, and source virtual role client A displays virtual role A in local user interface.

By pre-setting the trip ending condition and making the virtual role return to the source virtual role client when the trip ending condition is met (e.g. when a user initiatively ends the process or the life status of the virtual role does not meet the trip condition, etc.), the virtual role may simulate the real world more verisimilarly and service contents are enriched.

Figure 3:
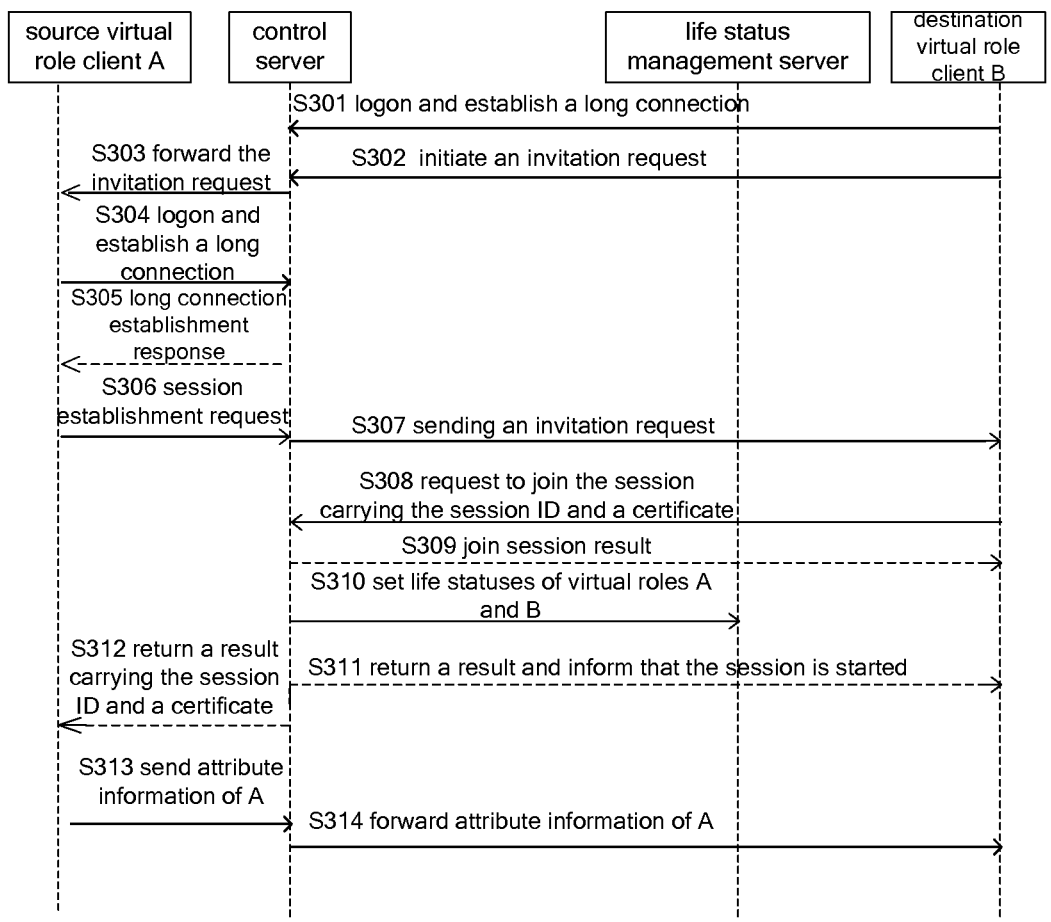
FIG. 3 is a flowchart illustrating a signaling procedure of a virtual role making a trip when a destination virtual role client initiates a trip request in accordance with an embodiment of the present invention.

Through the processes shown in FIG. 2 or FIG. 3, together with FIG. 4 and FIG. 5, a virtual role successfully completes a round trip to the destination. After the trip is ended, another trip may be started.

The Second Embodiment

In accordance with the present invention, another trip mode, referred to as 'wandering', is provided. In this trip mode, a source virtual role client of a virtual role may initiate to a control server on the network side a trip request without carrying identification information of a destination virtual role client, or setting the identification information as null or with invalid information. When receiving such a trip request, the control server may arrange the virtual role in a pre-determined public trip place and returns the virtual role back to the source virtual role client when the a trip ending condition is met. The public trip place may be a table in the control server. And the arranging the virtual role in the public trip place may be implemented by storing an ID of the source virtual role client of the virtual role being on the trip in the table.

In the second embodiment, it is also possible to set trip ending conditions, which is similar to the first embodiment and will not be repeated herein.

Figure 6:
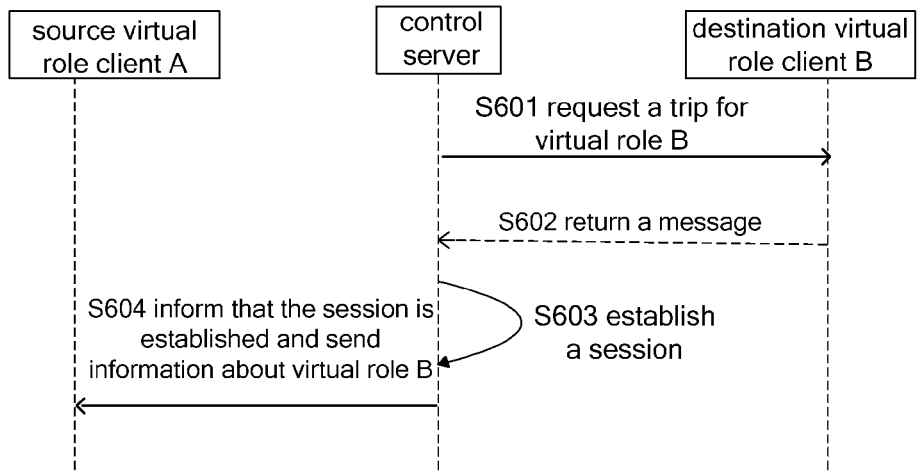
FIG. 6 is a schematic diagram illustrating a signaling procedure of a control server initiatively selecting a destination virtual role client for the trip of a virtual role in accordance with an embodiment of the present invention.

In particular, when there are two or more virtual roles in the public trip place, the control server may arrange a trip friend for a virtual role according to a pre-set matching policy. The matching policy may be preferably matching virtual roles with different values in gender fields or with the same value in residential location fields. The matching policy may be configured or changed and is not limited in the present invention. Generally, one preferred trip friend is selected to match a virtual role. When the virtual role leaves the public trip place, the control server may establish a session between the virtual role client of the virtual role leaving the public trip place and a virtual role client of a trip friend of the virtual role, and sends virtual role information of the trip friend to the virtual role client of the virtual role leaving the public trip place for display. The process is as shown in FIG. 6. Supposing that virtual role A and virtual role B are wandering in the public trip place, and the control server has arranged them to be trip friends of each other, the trip of virtual role A is to be ended, the process of initiating the trip of another virtual role by the control server may be as follows.

In step S601, the control server sends a trip request to virtual role client B of virtual role B.

In step S602, if virtual role client B of virtual role B allows virtual role B to make a trip, it returns a response message to the control server; otherwise, virtual role client B may not return any response or directly return a rejection message. When a timer expires or receiving the rejection message, the control server ends the procedure.

In step S603, after receiving the response message, the control server establishes locally a session between virtual role client A of virtual role A and virtual role client B of virtual role B.

In step S604, the control server informs virtual role client A of virtual role A that virtual role B is coming for a visit. Virtual role client A of virtual role A displays simultaneously in a local user interface local virtual role A and the trip friend brought back by virtual role A, i.e. virtual role B.

Through the above process, virtual role B makes a trip to virtual role client A of virtual role A. The second embodiment differentiates from the first embodiment in that: virtual role B firstly arrives at the public trip place adopting the 'wandering' trip mode, then makes a trip to another virtual role client together with another virtual role returning home from the public trip place.

After virtual role B makes a trip to virtual role client A of virtual role A as a trip friend of virtual role A, if a pre-set trip ending condition is met, virtual role B directly goes back to the virtual role client B.

This 'wandering' mode enriches the trip manners and approaches of the virtual role, and further enhances the quality of service.

Figure 7:
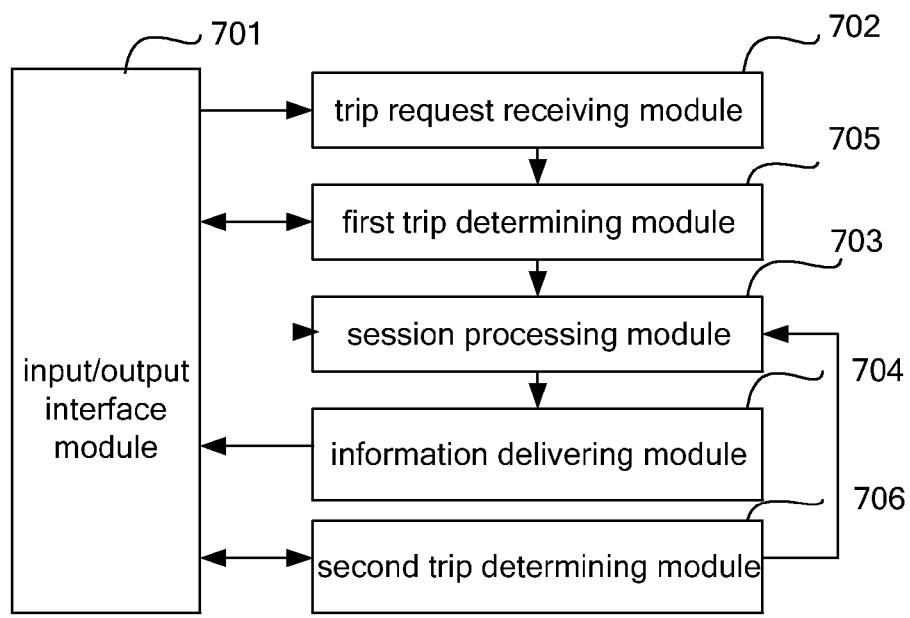
FIG. 7 is a schematic diagram illustrating a structure of a control server when a trip request includes an identification of a destination virtual role client in accordance with an embodiment of the present invention.

The method for controlling the virtual role is described above in detail with reference to embodiments. The server controlling the trip of a virtual role in accordance with the first embodiment of the present invention, i.e. a first control server, will be described in detail hereinafter. As shown in FIG. 7, the first control server in accordance with the present invention may include:

input/output interface module 701, being an interface module of the control server facing external devices, adapted to input or output data/signaling;

trip request receiving module 702, adapted to receive a trip request from a source virtual role client of a virtual role via input/output interface module 701, and output an instruction to session processing module 703 when determining the trip request carries identification information of a destination virtual role client;

session processing module 703, adapted to establish or delete a session between the source virtual role client and the destination virtual role client and inform information delivering module 704 that the session is established;

information delivering module 704, adapted to send attribute information of the virtual role obtained from the source virtual role client to the destination virtual role client.

The first control server provided by the present invention may further include:

first trip determining module 705, adapted to obtain current life status of the virtual role requesting a trip via input/output interface module 701, determine whether the current life status meets a pre-set trip condition and whether a virtual role of the destination virtual role client is in the destination virtual role client, output an instruction to session processing module 703 if the current life status meets the pre-set trip condition and the virtual role of the destination virtual role client is in the destination virtual role client, and return a request rejected message to the source virtual role client of the virtual role via the input/output interface module 701 if the current life status does not meet the pre-set trip condition or the virtual role of the destination virtual role client is not in the destination virtual role client.

The first control server may further include:

second trip determining module 706, adapted to determine whether the trip of the virtual role meets a pre-set trip ending condition, if the trip meets the pre-set trip ending condition, instruct the destination virtual role client to hide the virtual role via input/output interface module 701, instruct the source virtual role client to display the virtual role and instruct session processing module 703 to delete the session.

Figure 8:
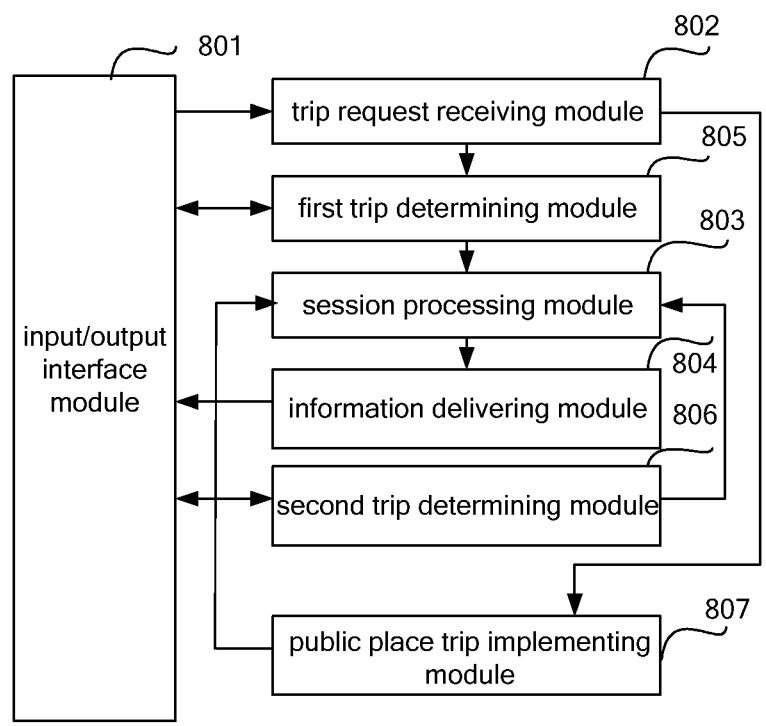
FIG. 8 is a schematic diagram illustrating a structure of a control server when a trip request does not include an identification of a destination virtual role client in accordance with an embodiment of the present invention.

The present invention also provides a second control server corresponding to the second embodiment. As shown in FIG. 8, the second control server may include:

input/output interface module 801, adapted to receive a trip request from a source virtual role client of a virtual role, and forward the trip request to trip request receiving module 802;

trip request receiving module 802, adapted to receive the virtual role trip request, and send an identification of the source virtual role client to public place trip implementing module 807;

public place trip implementing module 807, adapted to store the identification of the source virtual role client, finding a matching trip friend for the virtual role, and send an instruction message for establishing a session to session processing module 803;

session processing module 803, adapted to establish a session between the source virtual role client and the virtual role client of the trip friend, and inform information delivering module 804 that the session is established;

information delivering module 804, adapted to forward attribute information of the trip friend obtained from the virtual role client of the trip friend to the source virtual role client via input/output interface module 801.

The second control server provided by the present invention may further include:

first trip determining module 805, adapted to obtain current life status of the virtual role requesting a trip via input/output interface module 801, determine whether the life status meets a pre-set trip condition, output an instruction to session processing module 803 if the life status meets the pre-set trip condition, return a request rejected message to the source virtual role client via the input/output interface module 801 if the life status does not meet the pre-set trip condition.

The second control server may further include:

second trip determining module 806, adapted to determine whether the trip of the trip friend meets a trip ending condition, if the trip of the trip friend meets the trip ending condition, inform the source virtual role client to hide the virtual role of the trip friend, inform the virtual role client of the trip friend to display the virtual role of the trip friend and instruct session processing module 803 to delete the session.

Figure 9:
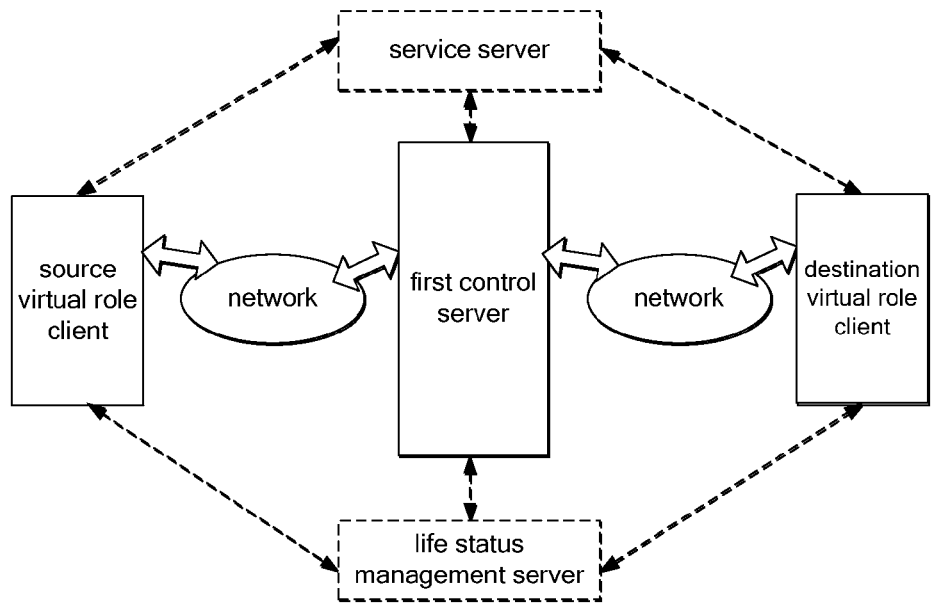
FIG. 9 is a schematic diagram illustrating a structure of a virtual role control system when a trip request includes an identification of a destination virtual role client in accordance with an embodiment of the present invention.

The present invention also provides a system for controlling a virtual role according to the method provided by the first embodiment. The structure of the system is as shown in FIG. 9, which includes: a source virtual role client of a virtual role, a destination virtual role client, and the first control server provided by the embodiment of the present invention.

Herein, the source virtual role client initiates a virtual role trip request to the first control server. The first control server establishes a session between the source virtual role client and the destination virtual role client, and sends relevant information of the virtual role obtained from the source virtual role client to the destination virtual role client via the network. The destination virtual role client displays the virtual role on the trip in a local user interface.

The system may further include a life status management server and at least one service server connected with the first control server.

The life status management server is adapted to send life status of the virtual role to the first control server. The at least one service server functions as inter-medium to the virtual role client for logging on the first control server.

Figure 10:
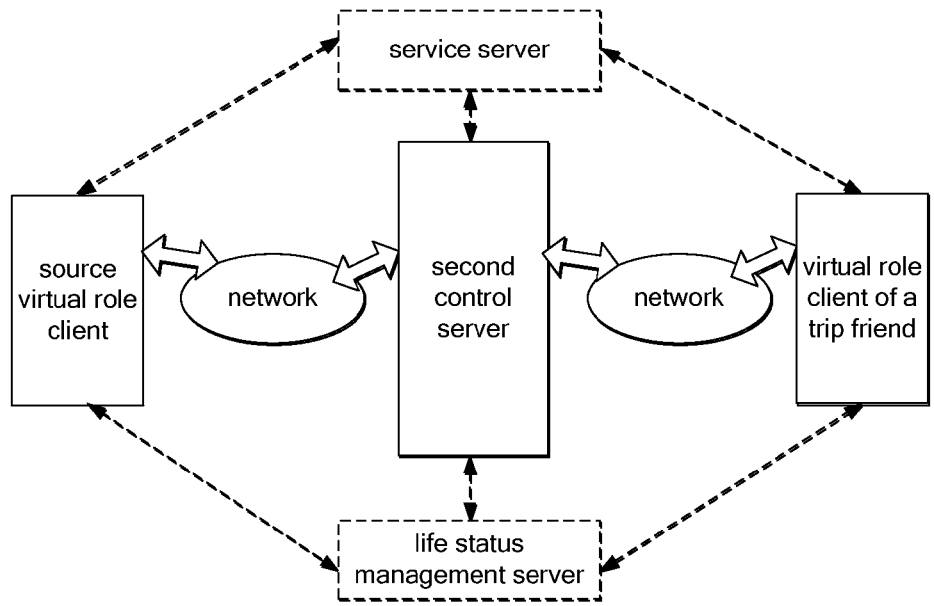
FIG. 10 is a schematic diagram illustrating a structure of a virtual role control system when a trip request does not include an identification of a destination virtual role client in accordance with an embodiment of the present invention.

The present invention also provides a system for controlling a virtual role corresponding to the second embodiment. The structure of the system is as shown in FIG. 10, which includes: a source virtual role client, a virtual role client of a trip friend, and the second control server provided by the embodiment of the present invention.

The source virtual role client is adapted to initiate a virtual role trip request requesting a trip for a virtual role, and display shapes of the virtual role and the trip friend simultaneously in a local user interface.

The second control server is adapted to store identification of the source virtual role client in the second control server, when there are identifications of at least two virtual role clients are stored in a public trip place table, find a matching trip friend for the virtual role according to a pre-set matching policy, establish a session between the source virtual role client and the virtual role client of the trip friend, and send information of the trip friend obtained from the virtual role client of the trip friend to the source virtual role client.

The virtual role client of the trip friend is adapted to display the trip friend when the session is ended.

The system may further include: a life status management server and at least one service server connected with the second control server.

The life status management server is adapted to send life status of the virtual role to the second control server. The at least one service server is adapted to function as an intermedium for the virtual role client to log on the second control server.

In view of the foregoing, according to the method of the present invention, the source virtual role client of the virtual role initiates a virtual role trip request carrying identification information of a destination virtual role client to the control server on the network side; the control server establishes a session between the source virtual role client and the destination virtual role client, and sends information about the virtual role to the destination virtual role client; the destination virtual role client displays the virtual role in a local user interface. Thus, the trip of the virtual role can be implemented by setting a control server at the network side for connecting the source virtual role client where the virtual role resides before the trip and the destination virtual role client. The implementation is simple, convenient and has a low cost. And there is no need to establish chatting between the source virtual role client and the destination virtual role client in advance.

According to the method of the present invention, a trip condition may be pre-set so that the virtual role is allowed to make a trip only when the trip condition is met, which further enriches the content of the service.

In the method of the present invention, a trip ending condition may be pre-set so that the virtual role returns to the source virtual role client when the trip ending condition is met (e.g. when the user initiatively calls the virtual role back, or when the current life status of the virtual role does not meet the trip condition, etc.), which simulates the real world more verisimilarly and further enriches service contents.

The method of the present invention also allows a virtual role without a specified trip destination to stay in a public trip place and have chance to bring back a trip friend from the public trip place, through which more trip manners and approaches can be provided and the quality of service can be enhanced.

The above are merely embodiments of the present invention, and should not be used for limiting the scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for controlling a virtual role, comprising:
   initiating, by a source virtual role client, a virtual role trip request to a control server requesting a trip for a virtual role of the source virtual role client, wherein the virtual role trip request carries an identification of a destination virtual role client;
   determining, by the control server, whether life status data of the virtual role meets a pre-set trip condition and whether a virtual role of the destination virtual role client is in the destination virtual role client, wherein the life status data is information indicating what the virtual role is doing;
   when the life status data of the virtual role meets the pre-set trip condition and the virtual role of the destination virtual role client is in the destination virtual role client, establishing, by the control server, a session between the source virtual role client and the destination virtual role client;
   sending, by the control server, attribute information of the virtual role obtained from the source virtual role client to the destination virtual role client;
   displaying, by the destination virtual role client, the virtual role in a local user interface based on the attribute information of the virtual role;
   determining, by the control server, whether the trip of the virtual role meets a pre-set trip ending condition, if the trip of the virtual role meets the pre-set trip ending condition, instructing the destination virtual role client to hide the virtual role and delete data of the virtual role from the destination virtual role client; instructing the source virtual role client to display the virtual role; and deleting the session between the source virtual role client and the destination virtual role client, wherein the trip ending condition comprise:
   trip duration of the virtual role reaches a pre-set maximum trip duration; or
   the destination virtual role client initiates an ending trip request; or
   the source virtual role client initiates an ending trip request; or
   the life status data of the virtual role meets the pre-set trip ending condition.

2. The method of claim 1, further comprising:
   sending, by the destination virtual role client, a virtual role trip invitation request to the control server, wherein the virtual role trip invitation request carries an identification of the source virtual role client;
   forwarding, by the control server, the virtual role trip invitation request to the source virtual role client based on the identification of the source virtual role client; and
   the source virtual role client initiates the virtual role trip request to the control server after receiving the virtual role trip invitation request.

3. The method of claim 1, wherein the virtual role client initiates the virtual role trip request to the control server after receiving an instruction of a user requesting a trip of the virtual role or detecting that the virtual role meets a pre-set trip condition.

4. The method of claim 1, wherein the establishing the session between the source virtual role client and the destination virtual role client comprises:
   sending, by the control server, a session request to the destination virtual role client based on the identification of the destination virtual role client;
   sending, by the destination virtual role client, a join session request to the control server if the destination virtual role client allows establishing the session;
   returning, by the control server, a join session result message to the destination virtual role client;

informing, by the control server, the destination virtual role client that the session is started;

informing, by the control server, the source virtual role client that the session is established.

5. The method of claim 1, further comprising:

sending instruction information for controlling the virtual role to the destination virtual role client after the session is established, and controlling, by the destination virtual role client, the virtual role based on the instruction information.

6. The method of claim 1, further comprising:

sending, by the source virtual role client, life status data of the virtual role to the control server after receiving the life status data periodically sent by a life status management server;

forwarding, by the control server, the life status data to the destination virtual role client;

updating, by the destination virtual role client, the virtual role locally displayed according to the life status data.

7. A method for controlling a virtual role, comprising:

initiating, by a source virtual role client, a virtual role trip request to a control server requesting a trip for a virtual role of the source virtual role client;

storing, by the control server, an identification of the source virtual role client of the virtual role;

finding, by the control server, a matching trip friend for the virtual role according to a pre-set matching policy when there are at least two virtual roles in a public trip place;

establishing, by the control server, a session between the source virtual role client of the virtual role and a virtual role client of the trip friend, deleting data of the virtual role and the trip friend from a data list of the public trip place after the session is established, obtaining attribute information of the trip friend and sending the attribute information of the trip friend to the source virtual role client;

displaying, by the source virtual role client in a local user interface, shapes of the virtual role based on attribute information of the virtual role and displaying the trip friend based on the attribute information of the trip friend;

determining, by the control server, whether the trip of the trip friend meets a pre-set trip ending condition, if the trip of the trip friend meets the pre-set trip ending condition, instructing the source virtual role client to hide the trip friend and delete data of the trip friend from the source virtual role client; instructing the virtual role client device of the trip friend to display the trip friend, and deleting the session between the source virtual role client and the virtual role client of the trip friend, wherein the trip ending condition comprise:

trip duration of the trip friend reaches a pre-set maximum trip duration; or the virtual role client of the trip friend initiates an ending trip request; or the source virtual role client initiates an ending trip request; or the life status data of the trip friend meets the pre-set trip ending condition;

making the trip friend return to the virtual role client of the trip friend when the trip of the trip friend meets a pre-set trip ending condition.

8. A control server device, comprising a processor coupled to a memory storing instructions for execution by the processor, and further comprising: an input/output interface module (701), a trip request receiving module (702), a session processing module (703) and an information delivering module (704) and a first trip determining module (705), wherein the input/output interface module (701) is adapted to receive a virtual role trip request initiated by a source virtual role client device of a virtual role, and forward attribute information of the virtual role obtained from the source virtual role client device to a destination virtual role client device;

the trip request receiving module (702) is adapted to receive the virtual role trip request, send an instruction to the session processing module (703) when determining that the virtual role trip request carries an identification of the destination virtual role client device; and the first trip determining module (705), adapted to obtain current life status data of the virtual role via the input/output interface module (701), determine whether the current life status data meets a pre-set trip condition and whether a virtual role of the destination virtual role client device is in the destination virtual role client device, output an instruction for establishing a session to the session processing module (703) if the current life status data meets the pre-set trip condition and the virtual role of the destination virtual role client device is in the destination virtual role client device, wherein the life status data is information indicating what the virtual role is doing;

the session processing module (703) is adapted to establish the session between the source virtual role client device and the destination virtual role client device based on the identification of the destination virtual role client device, and inform the information delivering module (704) that the session is established;

the information delivering module (704) is adapted to forward the attribute information of the virtual role via the input/output interface module (701) after being informed;

the control server device further comprises:

a second trip determining module (706), adapted to determine whether the trip of the virtual role meets a pre-set trip ending condition, if the trip of the virtual role meets the pre-set trip ending condition, instruct the destination virtual role client device to hide the virtual role and delete data of the virtual role from the destination virtual role client device, instruct the source virtual role client device to display the virtual role, and instruct the session processing module (703) to delete the session, wherein the trip ending condition comprise:

trip duration of the virtual role reaches a pre-set maximum trip duration; or the destination virtual role client initiates an ending trip request; or the source virtual role client initiates an ending trip request; or the life status data of the virtual role meets the pre-set trip ending condition.

9. The control server device of claim 8, wherein the information delivering module (704) is further adapted to send instruction information for controlling the virtual role to the input/output interface module (701).

10. A control server device, comprising a processor coupled to a memory storing instructions for execution by the processor, and further comprising an input/output interface module (801), a trip request receiving module (802), a session processing module (803), an information delivering module (804), and a public place trip implementing module (807), wherein the input/output interface module (801) is adapted to receive a virtual role trip request from a source virtual role client device of a virtual role, forward the virtual role trip request to the trip request receiving module (802), and send attribute information of a trip friend obtained from a virtual role client device of the trip friend to the source virtual role client device;

the trip request receiving module (802) is adapted to receive the virtual role trip request, send an identification of the source virtual role client device to the public place trip implementing module (807);

the public place trip implementing module (807) is adapted to store the identification of the source virtual role client device of the virtual role, match the trip friend for the virtual role according to a pre-set matching policy when there are at least two virtual roles in a public trip place, and send an instruction message for establishing a session to the session processing module (803);

the session processing module (803) is adapted to establish a session between the source virtual role client device and the virtual role client device of the trip friend, delete data of the virtual role and the trip friend from a data list of a public trip place after the session is established, and inform the information delivering module (804) that the session is established; and the information delivering module (804) is adapted to forward the attribute information of the trip friend via the input/output interface module after being informed;

a second trip determining module (806), adapted to determine whether the trip of the trip friend meets a pre-set trip ending condition, if the trip of the trip friend meets the pre-set trip ending condition, instruct the source virtual role client device to hide the trip friend, instruct the virtual role client device of the trip friend to display the trip friend, and instruct the session processing module 803 to delete the session, wherein the trip ending condition comprise:

trip duration of the trip friend reaches a pre-set maximum trip duration; or the virtual role client of the trip friend initiates an ending trip request; or the source virtual role client initiates an ending trip request; or the life status data of the trip friend meets the pre-set trip ending condition.

11. The control server device of claim 10, further comprising:

a first trip determining module 805, adapted to obtain current life status data of the virtual role requesting a trip, determine whether the current life status data meets a pre-set trip condition, output an instruction to the session processing module 803 if the current life status data meets the pre-set trip condition, return a request rejected message to the source virtual role client device of the virtual role via the input/output interface module 801 if the current life status data does not meet the pre-set trip condition.

12. A system for controlling a virtual role, comprising a source virtual role client device comprising a processor coupled to a memory storing instructions for execution by the processor, a control server device comprising a processor coupled to a memory storing instructions for execution by the processor, and a destination virtual role client device comprising a processor coupled to a memory storing instructions for execution by the processor, the source virtual role client device and the destination virtual role client device are respectively connected with the control server device, wherein the source virtual role client device is adapted to send a virtual role trip request carrying an identification of the destination virtual role client device;

the control server device is adapted to determine whether life status data of the virtual role meets a pre-set trip condition and whether a virtual role of the destination virtual role client is in the destination virtual role client; when the life status data of the virtual role meets the pre-set trip condition and the virtual role of the destination virtual role client is in the destination virtual role client, establish a session between the source virtual role client device and the destination virtual role client device based on the identification of the destination virtual role client device carried in the virtual role trip request, send attribute information of the virtual role obtained from the source virtual role client device to the destination virtual role client device, wherein the life status data is information indicating what the virtual role is doing; and the control server device is further adapted to determine whether the trip of the virtual role meets a pre-set trip ending condition, if the trip of the virtual role meets the pre-set trip ending condition, instruct the destination virtual role client to hide the virtual role and delete data of the virtual role from the destination virtual role client; instruct the source virtual role client to display the virtual role; and delete the session between the source virtual role client and the destination virtual role client, wherein the trip ending condition comprise:

trip duration of the virtual role reaches a pre-set maximum trip duration; or the destination virtual role client initiates an ending trip request; or the source virtual role client initiates an ending trip request; or the life status data of the virtual role meets the pre-set trip ending condition;

the destination virtual role client device is adapted to display the virtual role according to the attribute information of the virtual role.

13. The system of claim 12, further comprising:

a life status management server device, adapted to send life status data of the virtual role to the source virtual role client device;

the source virtual role client device is further adapted to send the life status data to the control server device after receiving the life status data of the virtual role;

the control server device is further adapted to send the life status data to the destination virtual role client device;

the destination virtual role client device is adapted to update the displayed virtual role based on the life status data.

14. The system of claim 12, further comprising:

a service server device, adapted to function as an intermedium via which the virtual role client device logs on the control server device.

15. A system for controlling virtual roles, comprising a source virtual role client device comprising a processor coupled to a memory storing instructions for execution by the processor, and a control server device comprising a processor coupled to a memory storing instructions for execution by the processor, wherein the source virtual role client device is adapted to initiate a virtual role trip request to the control server device;

the control server device is adapted to store an identification of the source virtual role client device carried in the virtual role trip request, match a trip friend for the virtual role based on a pre-set matching policy when there are at least two virtual roles in a public trip place, establish a session between the source virtual role client device and a virtual role client device of the trip friend, deleting data of the virtual role and the trip friend from a data list of a public trip place after the session is established, and forward attribute information of the trip friend obtained from the virtual role client device of the trip friend to the source virtual role client device; and the control server device is further adapted to determine whether the trip of the trip friend meets a pre-set trip ending condition, if the trip of the trip friend meets the pre-set trip ending condition, instruct the source virtual role client to hide the trip friend and delete data of the trip friend from the source virtual role client; instruct the virtual role client device of the trip friend to display the trip friend, and delete the session between the source virtual role client and the virtual role client of the trip friend, wherein the trip ending condition comprise:

trip duration of the trip friend reaches a pre-set maximum trip duration; or the virtual role client of the trip friend initiates an ending trip request; or the source virtual role client initiates an ending trip request; or the life status data of the trip friend meets the pre-set trip ending condition;

the source virtual role client device is further adapted to display shapes of the virtual role and the trip friend after receiving the attribute information of the trip friend.

16. The method of claim 7, wherein the pre-set matching policy comprises: selecting the trip friend which has a different value in a gender field with that of the virtual role or has the same value in a residential location field as that of the virtual role.

17. The control server device of claim 10, wherein the pre-set matching policy comprises: selecting the trip friend which has a different value in a gender field with that of the virtual role or has the same value in a residential location field as that of the virtual role.

18. The system of claim 15, wherein the pre-set matching policy comprises: selecting the trip friend which has a different value in a gender field with that of the virtual role or has the same value in a residential location field as that of the virtual role.

* * * * *